(12) United States Patent
Sakamoto (10) Patent No.: US 12,128,495 B2
(45) Date of Patent: Oct. 29, 2024

(54) WELDING GUN AND WELDING METHOD

(71) Applicant: SUBARU CORPORATION, Tokyo (JP)

(72) Inventor: Noboru Sakamoto, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 439 days.

(21) Appl. No.: 15/930,207

(22) Filed: May 12, 2020

(65) Prior Publication Data

US 2021/0008655 A1 Jan. 14, 2021

(30) Foreign Application Priority Data

Jul. 11, 2019 (JP) .................................. 2019-129483

(51) Int. Cl.
*B23K 11/11* (2006.01)
*B23K 11/30* (2006.01)
(Continued)

(52) U.S. Cl.
CPC ............. *B23K 11/312* (2013.01); *B23K 11/11* (2013.01); *B23K 11/115* (2013.01);
(Continued)

(58) Field of Classification Search
CPC ....... B23K 11/00; B23K 11/11; B23K 11/115; B23K 11/30; B23K 11/3009;
(Continued)

(56) References Cited

U.S. PATENT DOCUMENTS 1,601,927 A * 10/1926 Tobey ................ B23K 11/0935
219/83
2,678,367 A * 5/1954 Eisenburger ........... B23K 11/31
219/78.01
(Continued)

FOREIGN PATENT DOCUMENTS

CN 201455536 U * 5/2010
DE 428596 A * 5/1935 ............. B23K 11/06
(Continued)

OTHER PUBLICATIONS

Machine translation of KR-20120051557-A, Jun. 2024 (Year: 2024).*
Japanese Office Action, dated Jan. 10, 2023, in Japanese Application No. 2019-129483 and English Translation thereof.

*Primary Examiner* — Geoffrey S Evans
(74) *Attorney, Agent, or Firm* — MCGINN I.P. LAW GROUP, PLLC (57) ABSTRACT

A welding gun includes first and second movable arms, and first and second welding electrodes. The first and second movable arms are movable upward and downward. The first and second welding electrode are disposed respectively on the first and second movable arms. The welding gun is capable of performing a first mode in which the first and second welding electrodes are brought into contact with one side of a workpiece to weld the workpiece, and a second mode in which the workpiece is sandwiched by the first and second welding electrodes to weld the workpiece. The first and second welding electrodes are pivotally supported by the first and second movable arms, respectively. Each of the first and second welding electrodes has a rotatable roller shape. The first movable arm includes a first slide mechanism configured to allow the first welding electrodes to slide to below the second welding electrode.

11 Claims, 8 Drawing Sheets

(51) Int. Cl.
*B23K 11/31* (2006.01)
*B23K 101/00* (2006.01)

(52) U.S. Cl.
CPC ...... *B23K 11/3009* (2013.01); *B23K 11/3036* (2013.01); *B23K 2101/006* (2018.08)

(58) Field of Classification Search
CPC ... B23K 11/3036; B23K 11/312; B23K 11/06; B23K 11/061; B23K 11/063
USPC ....................................................... 219/86.9
See application file for complete search history.

(56) References Cited

U.S. PATENT DOCUMENTS

| | | | | |
|---|---|---|---|---|
| 3,265,277 | A * | 8/1966 | Bacroix | B21C 37/122 219/102 |
| 3,676,631 | A * | 7/1972 | Ritter | E04C 5/065 219/56 |
| 4,315,125 | A * | 2/1982 | Schmidt | B23K 11/06 219/56 |
| 4,963,712 | A * | 10/1990 | Etoh | B23K 11/312 219/86.7 |
| 5,811,750 | A * | 9/1998 | Caprioglio | B23K 11/309 219/81 |
| 2006/0006152 | A1 * | 1/2006 | Eek | B23K 11/28 219/86.25 |
| 2009/0231758 | A1 * | 9/2009 | Ohwe | G11B 5/486 360/234.3 |
| 2011/0017710 | A1 * | 1/2011 | Yasunaga | B23K 11/115 219/87 |
| 2015/0000956 | A1 * | 1/2015 | Spinella | B23K 11/20 219/78.16 |
| 2015/0020382 | A1 * | 1/2015 | Lee | B23P 6/00 29/729 |
| 2016/0346865 | A1 * | 12/2016 | Sigler | B23K 11/314 |
| 2019/0224773 | A1 * | 7/2019 | Radomski | B23K 11/0066 |

FOREIGN PATENT DOCUMENTS

| | | | | |
|---|---|---|---|---|
| DE | 102010020953 A1 * | 11/2011 | ............ | B23K 11/115 |
| JP | U1-H02-11677 | 1/1990 | | |
| JP | A-H07-284953 | 10/1995 | | |
| JP | A-H09-150277 | 6/1997 | | |
| JP | 2006102771 A * | 4/2006 | | |
| JP | 4836171 B2 | 12/2011 | | |
| JP | A-2013-071173 | 4/2013 | | |
| JP | A-2015-185345 | 10/2015 | | |
| KR | 20060015709 A * | 2/2006 | | |
| KR | 20120051557 A * | 5/2012 | | |

* cited by examiner

WELDING GUN AND WELDING METHOD

CROSS-REFERENCE TO RELATED APPLICATIONS

The present application claims priority from Japanese Patent Application No. 2019-129483 filed on Jul. 11, 2019, the entire contents of which are hereby incorporated by reference.

BACKGROUND

The disclosure relates to a welding gun and a welding method capable of, in welding workpieces such as automobile panels, easily performing (i) a mode in which the workpieces are sandwiched and welded and (ii) a mode in which welding is performed on one side of the workpieces, depending on a shape of the workpiece.

Figures 8A, 8B:
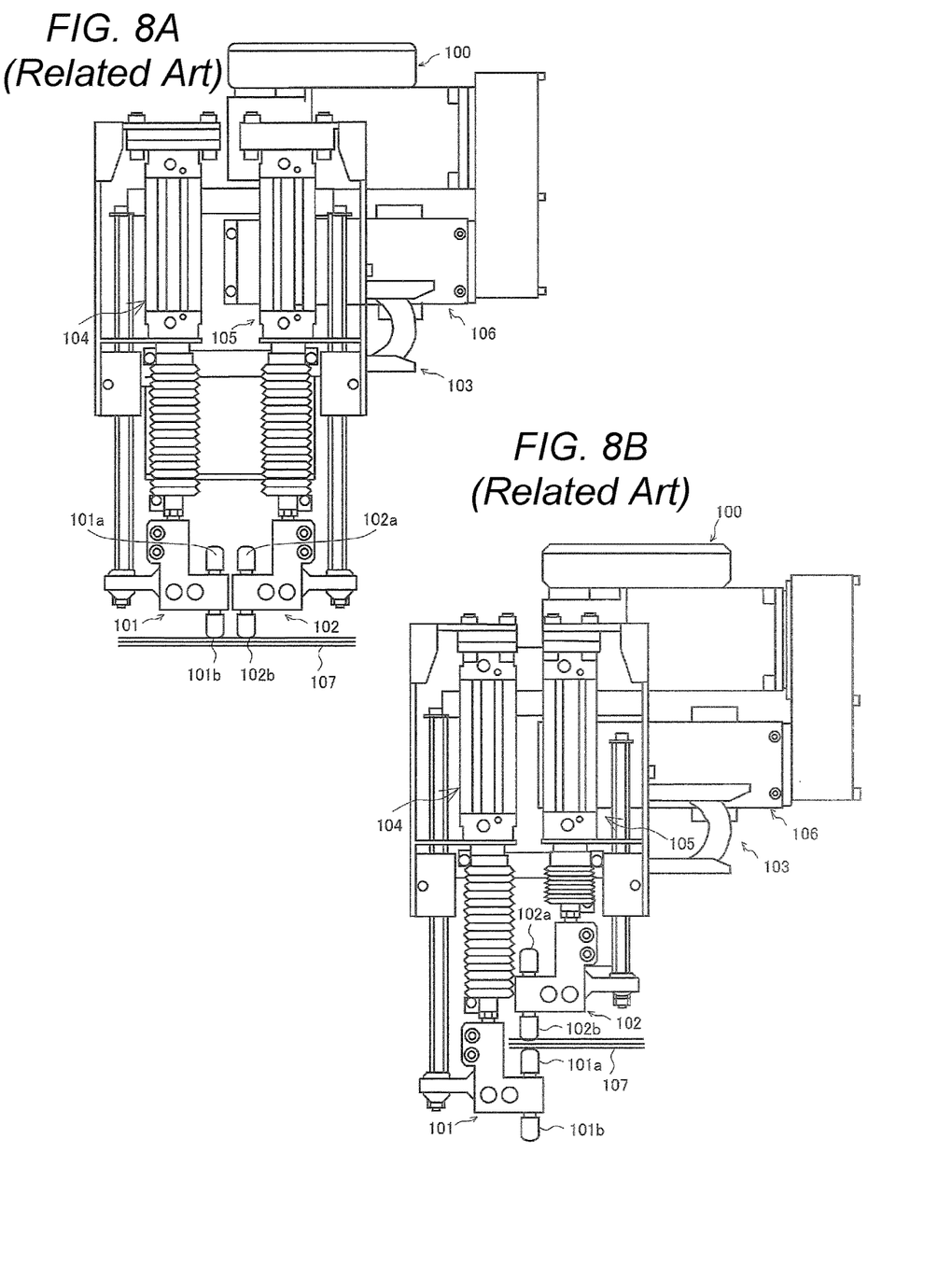
FIG. 8A and FIG. 8B are side views illustrating a resistance welding machine of a related art.

A structure illustrated in FIG. 8A and FIG. 8B is known as a resistance welding machine 100 of a related art. FIG. 8A and FIG. 8B are side views illustrating the resistance welding machine 100 of the related art.

As illustrated in FIG. 8A, the resistance welding machine 100 mainly includes a pair of welding electrodes 101 and 102, and a moving mechanism 103 coupled to the pair of welding electrodes 101 and 102. The moving mechanism 103 moves positions of the welding electrodes 101 and 102.

The welding electrodes 101 and 102 respectively include electrode surfaces 101a and 102a facing upward and electrode surfaces 101b and 102b facing downward. An intermediate portion between the electrode surfaces 101a and 101b and an intermediate portion between the electrode surfaces 102a and 102b are supported. The moving mechanism 103 includes a first vertical slide mechanism 104 that sliding the welding electrode 101 in a vertical direction, a second vertical slide mechanism 105 that slides the welding electrode 102 in the vertical direction, and a horizontal slide mechanism 106 that slides the welding electrode 102 in a horizontal direction.

As illustrated in the figure, when performing a series spot welding, workpieces 107 are set below the welding electrodes 101 and 102 at a standby position. Then, the welding is performed in the following manner, that is, the first vertical slide mechanism 104 and the second vertical slide mechanism 105 are moved downward, the workpieces 107 are pressurized in a state where the left and right welding electrodes 101 and 102 are arranged side by side, and the workpieces 107 are energized.

As illustrated in FIG. 8B, when performing a direct spot welding, the first vertical slide mechanism 104 is operated to move the welding electrode 101 downward, and the horizontal slide mechanism 106 is operated to move the welding electrode 102 toward the welding electrode 101. After the electrode surface 101a, facing upward, of the welding electrode 101 and the electrode surface 102b, facing downward, of the welding electrode 102 face each other, the workpieces 107 are placed therebetween. Thereafter, the welding is performed in the following manner, that is, the second vertical slide mechanism 105 is operated to move the welding electrode 102 downward, the workpieces 107 are pressurized with the electrode surfaces 101a and 102b, and the workpieces 107 are energized (for example, see Japanese Patent No. 4836171).

SUMMARY

A first aspect of the disclosure provides a welding gun includes first and second movable arms, and first and second welding electrodes. The first and second movable arms are movable upward and downward. The first welding electrode is disposed on the first movable arm. The second welding electrode is disposed on the second movable arm. The welding gun is capable of performing a first mode in which the first and second welding electrodes are brought into contact with one side of workpieces to weld the workpieces, and a second mode in which the workpieces are sandwiched by the first and second welding electrodes to weld the workpieces. The first and second welding electrodes are pivotally supported by the first and second movable arms, respectively. Each of the first and second welding electrodes has a rotatable roller shape. The first movable arm includes a first slide mechanism configured to allow the first welding electrodes to slide to below the second welding electrode.

A second aspect of the disclosure provides a welding method using a welding gun. The welding gun includes first and second movable arms, first and second welding electrodes, and a slide mechanism. The first and second movable arms are movable upward and downward. The first and second welding electrodes are disposed on the first and second movable arms, respectively. Each of the first and second welding electrodes has a roller shape rotatable with respect to the corresponding one of the first and second movable arms. The slide mechanism is disposed on at least one of the first movable arm or the second movable arm. The welding method includes enabling the first welding electrode to slide to below the second welding electrode by the slide mechanism, so as to enable a first mode in which the first welding electrode and the second welding electrode are brought into contact with one side of a workpiece to weld the workpiece, and a second mode in which the workpiece is sandwiched between the first welding electrode and the second welding electrode to weld the workpieces.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

As illustrated in FIG. 8A and FIG. 8B, a resistance welding machine 100 appropriately operates a moving mechanism 103 to perform a direct spot welding with workpieces 107 being sandwiched between welding electrodes 101 and 102, or perform a series spot welding with the welding electrodes 101 and 102 being arranged side by side on one side of the workpieces 107.

The welding electrodes 101 and 102 include electrode surfaces 101a and 102a facing upward and electrode surfaces 101b and 102b facing downward. Directions of the electrode surfaces 101a, 102a, 101b, and 102b cannot be changed according to the workpieces 107. Therefore, when the workpieces 107 are sandwiched from a lateral direction and welded, the resistance welding machine 100 itself is to be rotated by 90°.

If the resistance welding machine 100 can be rotated by 90°, welding is performed. On the other hand, if there is not enough space to rotate the resistance welding machine 100 around the workpieces 107, the welding may not be performed on the workpieces 107. The welding is restricted depending on a shape of the workpiece 107.

In the resistance welding machine 100, the moving mechanism 103 includes a first vertical slide mechanism 104, a second vertical slide mechanism 105, and a horizontal slide mechanism 106. Positions of the electrode surfaces 101a, 102a, 101b, and 102b of the welding electrodes 101 and 102 are adjusted by appropriately operating the mechanisms 104, 105, and 106. Therefore, structures of the welding electrodes 101 and 102 are complicated, and a structure of the moving mechanism 103 is also complicated.

It is desirable to provide a welding gun and a welding method capable of, when welding workpieces such as automobile panels, easily performing a mode in which the workpieces are sandwiched and welded, or a mode in which a welding is performed from one side of the workpieces, depending on a shape of the workpieces.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

First, a welding gun 10 and a welding method according to an embodiment of the disclosure will be described in detail with reference to the accompanying figures. In the description of the present embodiment, the same reference numerals are used for the same members in principle, and repeated description will be omitted.

Figure 1:
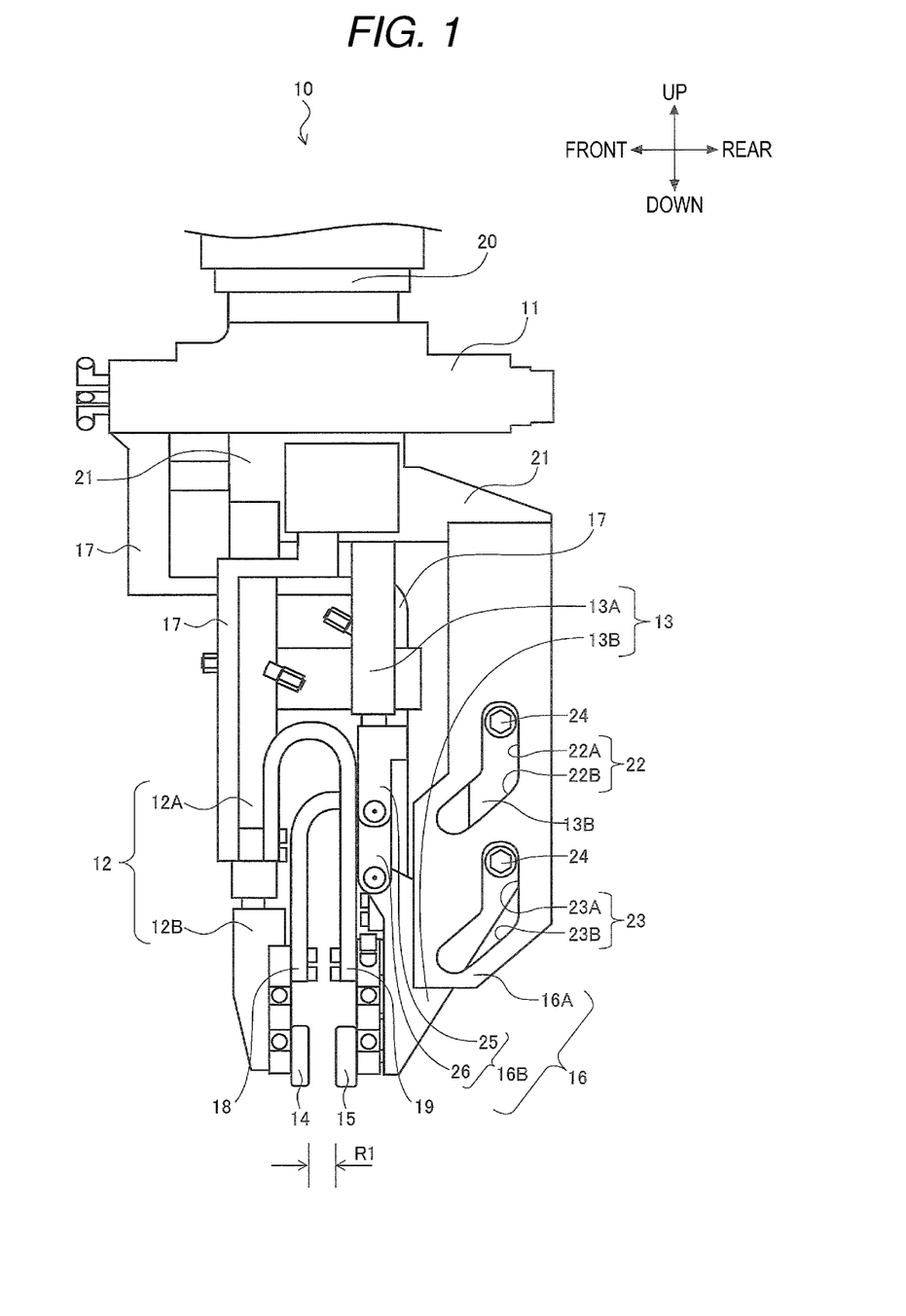
FIG. 1 is a side view illustrating a welding gun according to an embodiment of the disclosure.
Figure 2A:
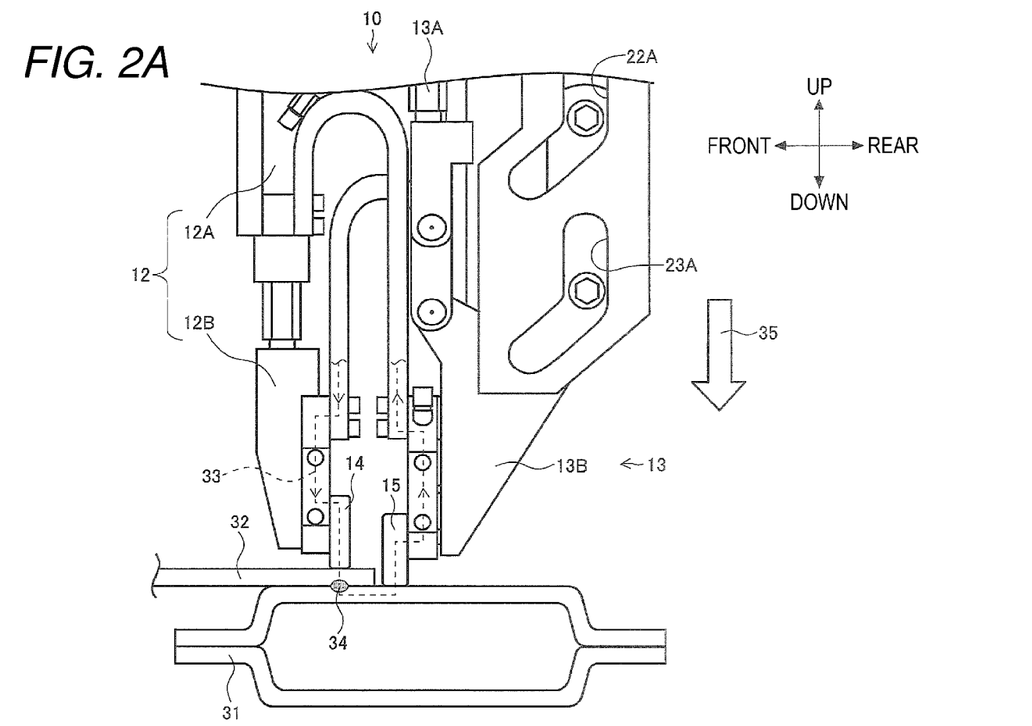
FIG. 2A and FIG. 2B are side views illustrating a welding method according to the embodiment of the disclosure.
Figure 2B:
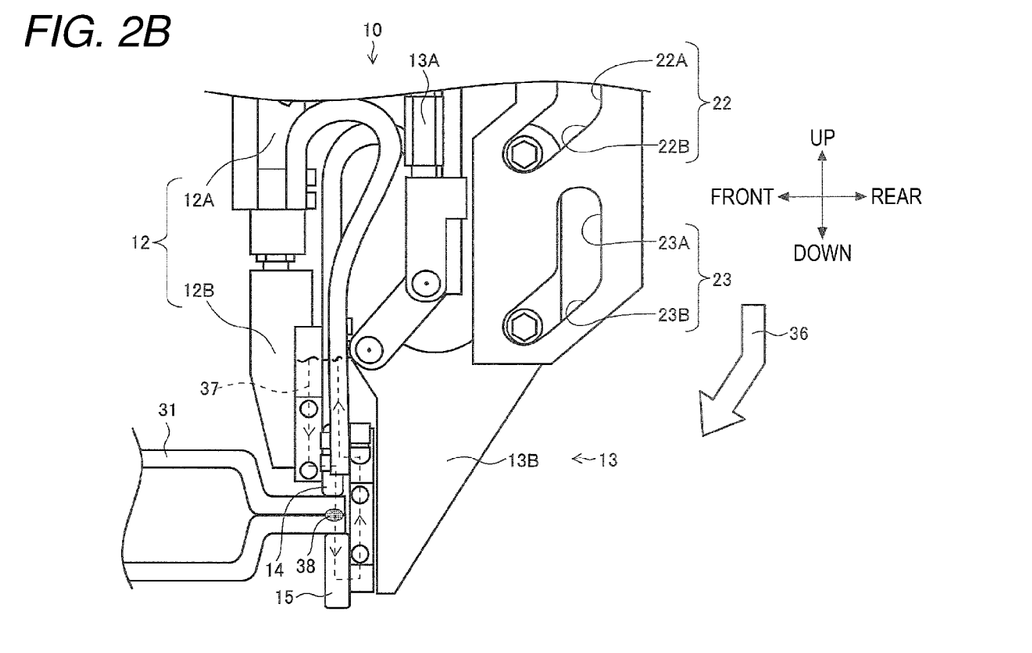
Figure 3A:
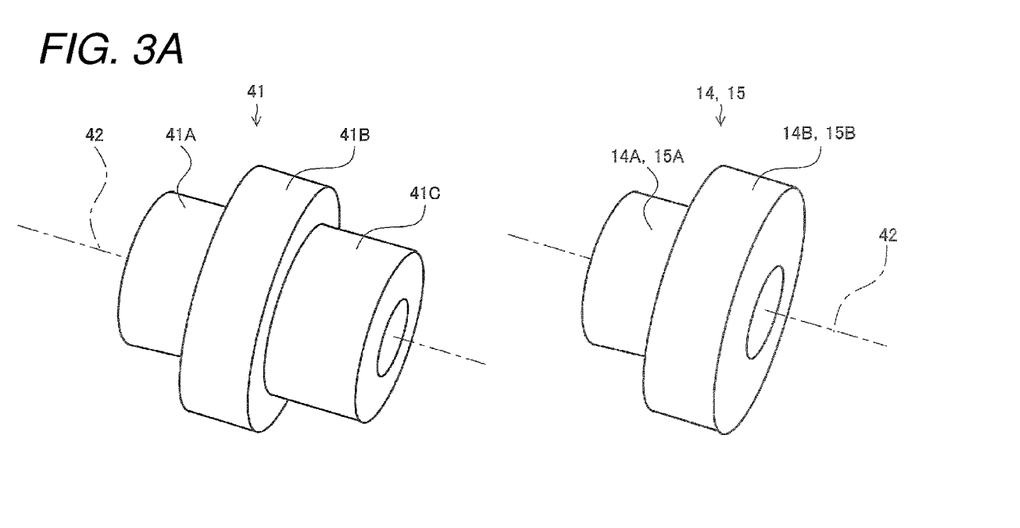
FIG. 3A is a perspective view illustrating welding electrodes of the welding gun according to the embodiment of the disclosure.
Figure 3B:
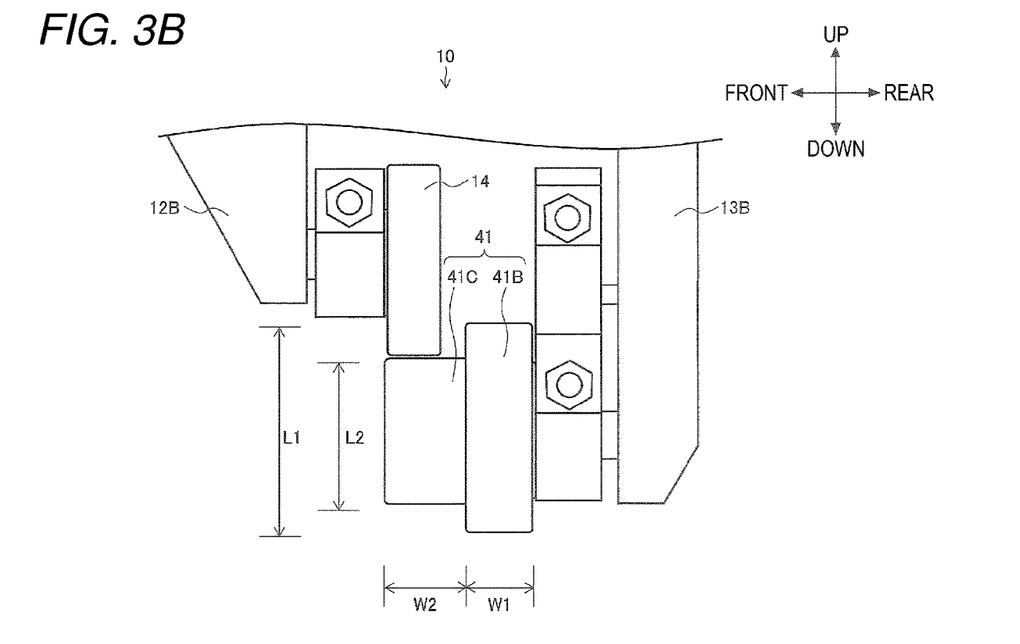
FIG. 3B is a side view illustrating the welding electrodes of the welding gun according to the embodiment of the disclosure.
Figure 4A:
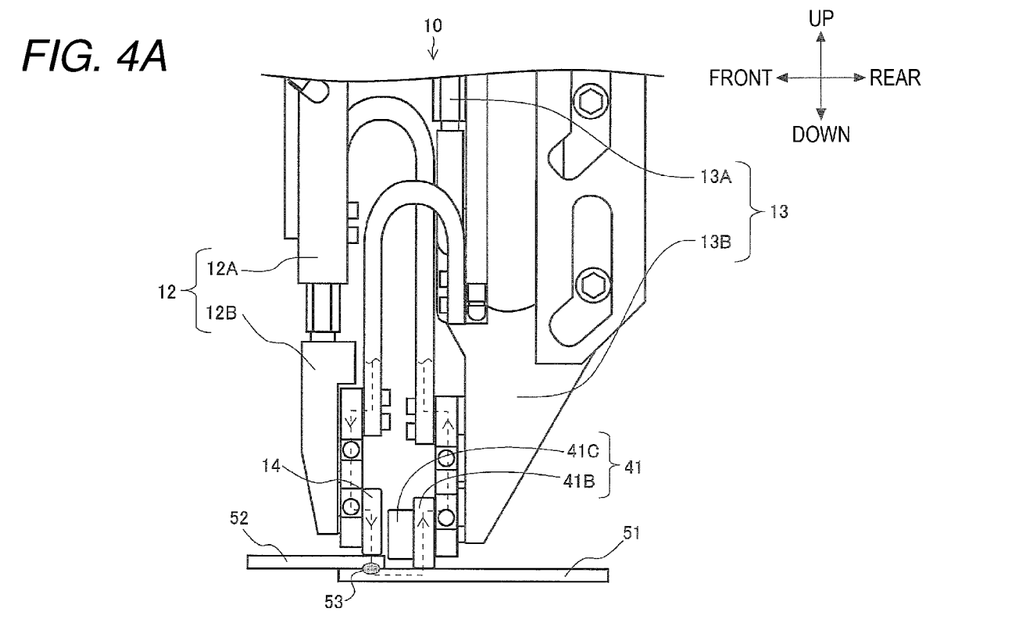
FIG. 4A and FIG. 4B are side views illustrating welding methods according to the embodiment of the disclosure.
Figure 4B:
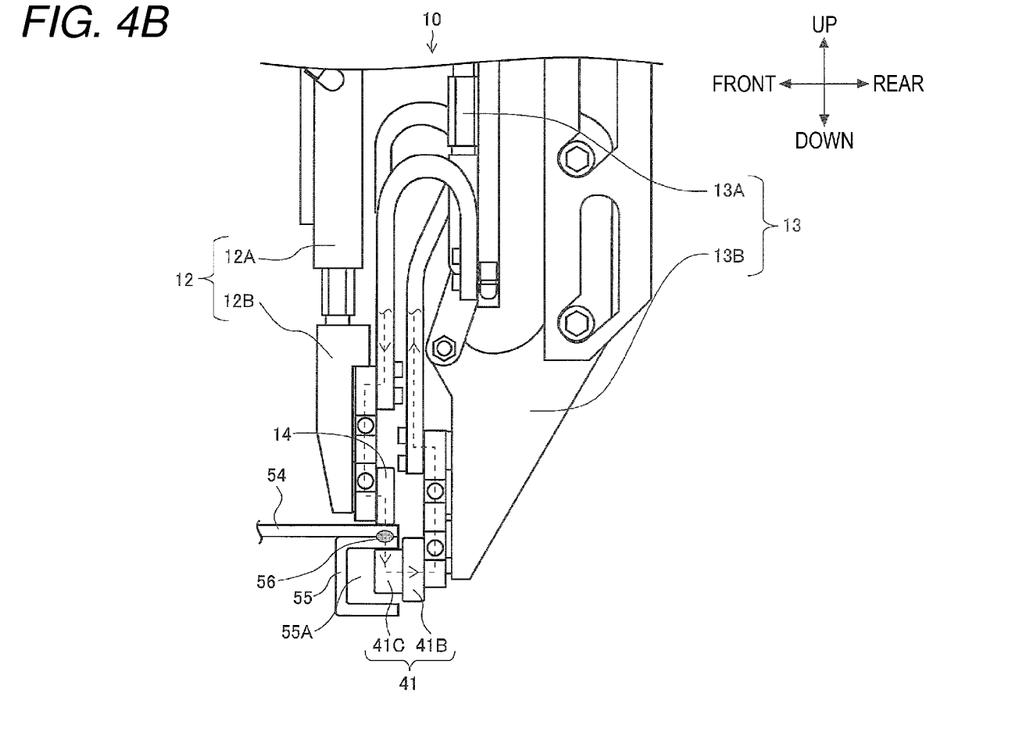

FIG. 1 is a side view illustrating the welding gun 10 according to the present embodiment. FIG. 2A and FIG. 2B are side views illustrating a welding method using the welding gun according to the present embodiment. FIG. 3A is a perspective view illustrating a welding electrode 41 of the welding gun 10 according to the present embodiment. FIG. 3B is a side view illustrating the welding electrode 41 of the welding gun 10 according to the present embodiment. FIG. 4A and FIG. 4B are side views illustrating welding methods using the welding gun 10 according to the present embodiment.

As illustrated in FIG. 1, the welding gun 10 is disposed and used at a tip end of an arm 20 of a welding robot (not illustrated) in an automobile assembly line or the like. The welding gun 10 mainly includes a transformer 11, a pair of movable arms 12 and 13 extending and retracting in a vertical direction, a pair of welding electrodes 14 and 15 disposed on tip ends of the pair of movable arms 12 and 13, a slide mechanism 16 assembled in the movable arm 13, a wiring board 17 serving as a current path, and a pair of shunts 18 and 19 supporting movements of the pair of movable arms 12 and 13.

The transformer 11 is disposed on an upper end side of the welding gun 10, amplifies a current supplied from the welding robot during the welding, and supplies the amplified current to the pair of welding electrodes 14 and 15. The transformer 11 is reduced to such a size that the transformer 11 can be mounted on the welding gun 10, and is also reduced in weight. The transformer 11 implements efficient welding with lower power consumption.

The movable arm 12 is a welding-side arm. The movable arm 12 mainly includes an air cylinder 12A extending and retracting in a vertical direction of the welding gun 10, and an electrode support bracket 12B disposed on a tip end of a shaft for extension and retraction of the air cylinder 12A.

The movable arm 13 is a ground-side arm. The movable arm 13 mainly includes an air cylinder 13A extending and retracting in the vertical direction of the welding gun 10, and an electrode support bracket 13B disposed on a tip end of a shaft for extension and retraction of the air cylinder 13A.

The welding electrode 14 is a welding-side electrode. The welding electrode 14 is formed of, for example, a copper alloy material having excellent electrical conductivity and thermal conductivity, and has a roller shape. As will be described in details later, a rotating shaft 14A (see FIG. 3A) of the welding electrode 14 is pivotally supported by a bearing (not illustrated) with respect to the electrode support bracket 12B of the movable arm 12. The welding electrode 14 can be rotationally moved while being in contact with a workpiece 31 (see FIG. 2A).

The welding electrode 15 is a ground-side electrode. The welding electrode 15 is formed of, for example, a copper alloy material having excellent electrical conductivity and thermal conductivity, and has a roller shape. As will be described in details later, a rotating shaft 15A (see FIG. 3A) of the welding electrode 15 is pivotally supported by a bearing (not illustrated) with respect to the electrode support bracket 13B of the movable arm 13. The welding electrode 15 can be rotationally moved while being in contact with the workpiece 31.

The slide mechanism 16 mainly includes a pair of plate portions 16A that movably support the electrode support bracket 13B of the movable arm 13 in a substantially vertical direction, and a link mechanism 16B disposed between the air cylinder 13A and the electrode support bracket 13B of the movable arm 13.

Each of the plate portions 16A is, for example, a substantially rectangular plate-shaped body formed from a steel plate such as an iron plate. The plate portions 16 are fixed to a bracket 21 that fixes the movable arms 12 and 13. In the plate portion 16A, guide grooves 22 and 23 each having a substantially rotated V-shape are formed substantially in parallel. Support pins (not illustrated) having rollers 24 at both ends thereof are disposed in the guide grooves 22 and 23 so as to bridge the pair of plate portions 16A. As illustrated in the figure, a rear end of the electrode support bracket 13B is fixed at two positions to the two support pins between the pair of plate portions 16A.

The link mechanism 16B mainly includes a first arm portion 25 fixed to a tip end of the shaft of the air cylinder 13A, and a second arm portion 26 rotatably coupled to a lower end of the first arm portion 25. A lower end of the second arm portion 26 is fixed to a front end of the electrode support bracket 13B.

With this structure, the electrode support bracket 13B is guided along the shapes of the guide grooves 22 and 23 in conjunction with an extending operation of the shaft of the air cylinder 13A. For example, when the air cylinder 13A starts to extend, the electrode support bracket 13B is guided by vertical grooves 22A and 23A, and slides downward while maintaining a separation distance R1 in a horizontal direction between the welding electrodes 14 and 15. Thereafter, in response to the extension of the air cylinder 13A, the electrode support bracket 13B is guided by oblique grooves 22B and 23B, and obliquely slides downward such that the welding electrode 15 approaches the welding electrode 14.

The wiring board 17 is formed of a copper plate having excellent electrical conductivity and thermal conductivity, and is disposed on side surfaces of the movable arms 12 and 13. One end of the wiring board 17 is electrically coupled to an electrode of the transformer 11, and the other end of the wiring board 17 is electrically coupled to the shunts 18 and 19. Since the wiring board 17 is formed as a plate-shaped body, the wiring board 17 allows a large current to flow therethrough during the welding.

The shunts 18 and 19 are each formed of a copper plate having excellent electrical conductivity and thermal conductivity. Since the shunts 18 and 19 are formed by stacking thin copper plates, the shunts 18 and 19 are excellent in flexibility. The shunts 18 and 19 can be deformed following movements of the movable arms 12 and 13. One ends of the shunts 18 and 19 are electrically coupled to the wiring board 17, and the other ends of the shunts 18 and 19 are electrically coupled to the welding electrodes 14 and 15. The shunts 18 and 19 allow a large current to flow from the welding electrode 14 to the welding electrode 15 during a welding operation.

FIG. 2A illustrates a mode of welding a plate-shaped workpiece 32 to one side of the bag-shaped workpiece 31 by a series spot welding or an indirect spot welding, for example. When a shape of the workpiece 31 is a bag structure, welding portions of the workpieces 31 and 32 cannot be sandwiched by the welding electrodes 14 and 15. The welding electrodes 14 and 15 are arranged side by side on the one side of the workpiece 31 to perform the welding. In the following description of the welding method, FIG. 1 will be appropriately referred to.

First, as illustrated in FIG. 1, in the welding gun 10, the air cylinders 12A and 13A of the movable arms 12 and 13 are in the most retracted state, and the welding electrodes 14 and 15 are in a state of facing each other at the same height.

Next, as illustrated in FIG. 2A, after the workpiece 32 is placed on an upper surface of the workpiece 31, the arm 20 (see FIG. 1) of the welding robot (not illustrated) is moved to bring the welding electrode 14 into contact with an upper surface of the workpiece 32 that is a desired welding position. In a movable arm 12, the air cylinder 12A is extended until a desired pressurized state is achieved, and an outer peripheral surface in a radial direction on a lower surface side of the welding electrode 14 pressurizes the upper surface of the workpiece 32.

In a movable arm 13, the air cylinder 13A is extended simultaneously while the welding electrode 14 on the movable arm 12 side is in contact with the workpiece 32, and an outer peripheral surface in a radial direction on a lower surface side of the welding electrode 15 pressurizes the upper surface of the workpiece 31. The welding electrodes 14 and 15 are arranged side by side on the one side of the workpiece 31, and the workpieces 31 and 32 are pressurized by the welding electrodes 14 and 15. As illustrated by an arrow 35, the movable arm 13 is guided by the vertical grooves 22A and 23A to slide in the vertical direction while maintaining the separation distance R1 in the horizontal direction (see FIG.

Next, a control device (not illustrated) in the welding robot flows a current for a desired time based on a welding condition when a measured value of a pressing force by the welding electrodes 14 and 15 reaches a set condition value. When a large current flows from the welding electrode 14 on a welding side to the welding electrode 15 on a ground side as illustrated by a dotted arrow 33, a nugget 34 is formed around a boundary surface between the workpieces 31 and 32 immediately below the welding electrode 14.

FIG. 2B illustrates a mode of welding an overlapping region on an end portion of the bag-shaped workpiece 31 by a direct spot welding, for example. The overlapping region on the end portion of the workpiece 31 has a space where the welding electrodes 14 and 15 are arranged in the vertical direction thereof, and a welding position of the workpiece 31 can be sandwiched by the welding electrodes 14 and 15. In the following description of the welding method, FIG. 1 will be appropriately referred to.

First, as illustrated in FIG. 1, in the welding gun 10, the air cylinders 12A and 13A of the movable arms 12 and 13 are in the most retracted state, and the welding electrodes 14 and 15 are in a state of facing each other at the same height.

Next, as illustrated in FIG. 2B, in the movable arm 13, the air cylinder 13A is brought in the most extended state, so that the electrode support bracket 13B is guided along the shapes of the guide grooves 22 and 23, the welding electrode 15 is moved to below the welding electrode 14, and the outer peripheral surface in the radial direction on the lower surface side of the welding electrode 14 faces the outer peripheral surface in the radial direction on an upper surface side of the welding electrode 15. The movable arm 13 is guided by the vertical grooves 22A and 23A to slide in the vertical direction as illustrated by an arrow 36, and is then guided by the oblique grooves 22B and 23B to slide obliquely downward.

Next, the arm 20 (see FIG. 1) of the welding robot (not illustrated) is moved to bring the outer peripheral surface in the radial direction on the upper surface side of the welding electrode 15 into contact with a lower surface of the overlapping region of the workpiece 31 that is a desired welding position. In the movable arm 12, the air cylinder 12A is extended to bring the outer peripheral surface in the radial direction on the lower surface side of the welding electrode 14 into contact with an upper surface of the desired welding position of the workpiece 31, and to pressurize the upper surface of the workpiece 31. By this operation, the welding position of the workpiece 31 is in a state of being sandwiched between the welding electrodes 14 and 15.

Next, a control device (not illustrated) in the welding robot flows a current for a desired time based on a welding condition when a measured value of a pressing force by the welding electrodes 14 and 15 reaches a set condition value. When a large current flows from the welding electrode 14 on the welding side to the welding electrode 15 on the ground side as illustrated by a dotted arrow 37, a nugget 38 is formed around a boundary surface in the overlapping region of the workpiece 31 immediately below the welding electrode 14.

Here, in FIG. 2A, the welding electrodes 14 and 15 can be rotationally moved from a near side to a far side of the figure sheet or from the far side to the nearside of the figure sheet while the upper surfaces of the workpieces 31 and 32 are pressurized by the outer peripheral surfaces in the radial direction on the lower surface sides of the welding electrode 14 and 15. When a large current is supplied on a welding robot side while the welding electrodes 14 and 15 are rotationally moved and pressurizes the upper surfaces of the workpieces 31 and 32, a seam welding can be performed on the workpieces 31 and 32.

On the other hand, when pulse energization is performed on the welding robot side while the welding electrodes 14 and 15 are rotationally moved and pressurize the upper surfaces of the workpieces 31 and 32, a continuous spot welding can be performed without releasing the pressurized state for each welding point.

In FIG. 2B, similarly, the seam welding and the continuous spot welding can be performed by rotationally moving the welding electrodes 14 and 15 sandwiching the overlapping region of the workpiece 31 from the near side to the far side of the figure sheet or from the far side to the near side of the figure sheet.

Next, a welding electrode 41 mounted on the welding gun 10 will be described with reference to FIG. 3A and FIG. 3B. The welding electrode 41 is a modified example of the welding electrodes 14 and 15 illustrated in FIG. 1, and may be adopted as at least one of the welding-side electrode or the ground-side electrode.

As illustrated in FIG. 3A, the welding electrode 41 is formed of, for example, a copper alloy material having excellent electrical conductivity and thermal conductivity, and has a roller shape. The welding electrode 41 mainly includes a rotating shaft 41A rotatably supported by the electrode support brackets 12B and 13B (see FIG. 3B), and a first welding column portion 41B and a second welding column portion 41C that are to be brought into contact with a workpiece 51 (see FIG. 4A).

On the other hand, the welding electrodes 14 and 15 mainly include the rotating shafts 14A and 15A rotatably supported by the electrode support brackets 12B and 13B (see FIG. 1) respectively, and welding column portions 14B and 15B that are to be brought into contact with the workpieces 31 and 32 (see FIG. 2A).

As illustrated in the figure, in the welding electrode 41, the second welding column portion 41C is continuously formed from a tip end of the first welding column portion 41B in a thrust direction. As illustrated by a chain line 42, the rotating shaft 41A, the first welding column portion 41B, and the second welding column portion 41C are arranged on the same axis.

As illustrated in FIG. 3B, a diameter L2 in a radial direction of the second welding column portion 41C is smaller than a diameter L1 in the radial direction of the first welding column portion 41B. A width W2 in the thrust direction of the second welding column portion 41C is wider than a width W1 in the thrust direction of the first welding column portion 41B.

As illustrated in FIG. 4A, the welding electrode 14 is pivotally supported by the electrode support bracket 12B of the movable arm 12, and is used as the welding-side electrode. On the other hand, the welding electrode 41 is pivotally supported by the electrode support bracket 13B of the movable arm 13, and is used as the ground-side electrode. As described above with reference to FIG. 2A, when the welding electrodes 14 and 41 are arranged side by side on one side of workpieces 51 and 52 and welding is performed, in the welding electrode 41, an outer peripheral surface in a radial direction on a lower surface side of the first welding column portion 41B is brought into contact with an upper surface of the workpiece 52 at a desired welding position.

As illustrated in FIG. 4B, even when the welding electrode 41 is used, workpieces 54 and 55 can be sandwiched between the welding electrodes 14 and 41 to perform the welding. As described above with reference to FIG. 2B, at the desired welding position, the outer peripheral surface in the radial direction on the lower surface side of the welding electrode 14 on the welding side is brought into contact with an upper surface of the workpiece 54, and an outer peripheral surface in a radial direction on an upper surface side of the welding electrode 41 on the ground side is brought into contact with a lower surface of the workpiece 55.

At this time, a current path during the welding passes through a region where the welding electrodes 14 and 41 face each other. The width W2 of the second welding column portion 41C (see FIG. 3B) is wider than the width W1 of the first welding column portion 41B (see FIG. 3B), and the diameter L2 of the second welding column portion 41C (see FIG. 3B) is smaller than the diameter L1 of the first welding column portion 41B (see FIG. 3B), so that the welding can be performed on the workpiece 55 with various shapes.

For example, when the workpiece 55 has a substantially rotated U shape in cross section as illustrated in FIG. 4B, it may be difficult to weld the workpieces 54 and 55 in the welding mode described above with reference to FIG. 2A and FIG. 2B, but the workpieces 54 and 55 can be welded using the welding electrode 41.

That is, as illustrated in the figure, the first welding column portion 41B cannot be inserted into a hollow portion 55A of the workpiece 55 due to a size of the diameter L1, but the second welding column portion 41C can be inserted. As described above with reference to FIG. 2B, a nugget 56 can be formed by sandwiching desired welding positions of the workpieces 54 and 55 between the welding electrode 14 and the second welding column portion 41C of the welding electrode 41.

The seam welding and the continuous spot welding can be performed by sliding the welding electrodes 14 and 41 from a near side to a far side of the figure sheet or from the far side to the near side of the figure sheet with respect to the workpieces 54 and 55.

Next, a welding gun 60 and a welding method according to another embodiment of the disclosure will be described in detail with reference to the figures. In the description of the present embodiment, the same reference numerals are used for the same members in principle, and repeated description will be omitted. Since the welding gun 60 mainly differs from the welding gun 10 illustrated in FIG. 1 in the structure of movable arms 61 and 62, the same reference numerals are used for other structures and the above description will be referred to, and repeated description will be omitted.

Figure 5:
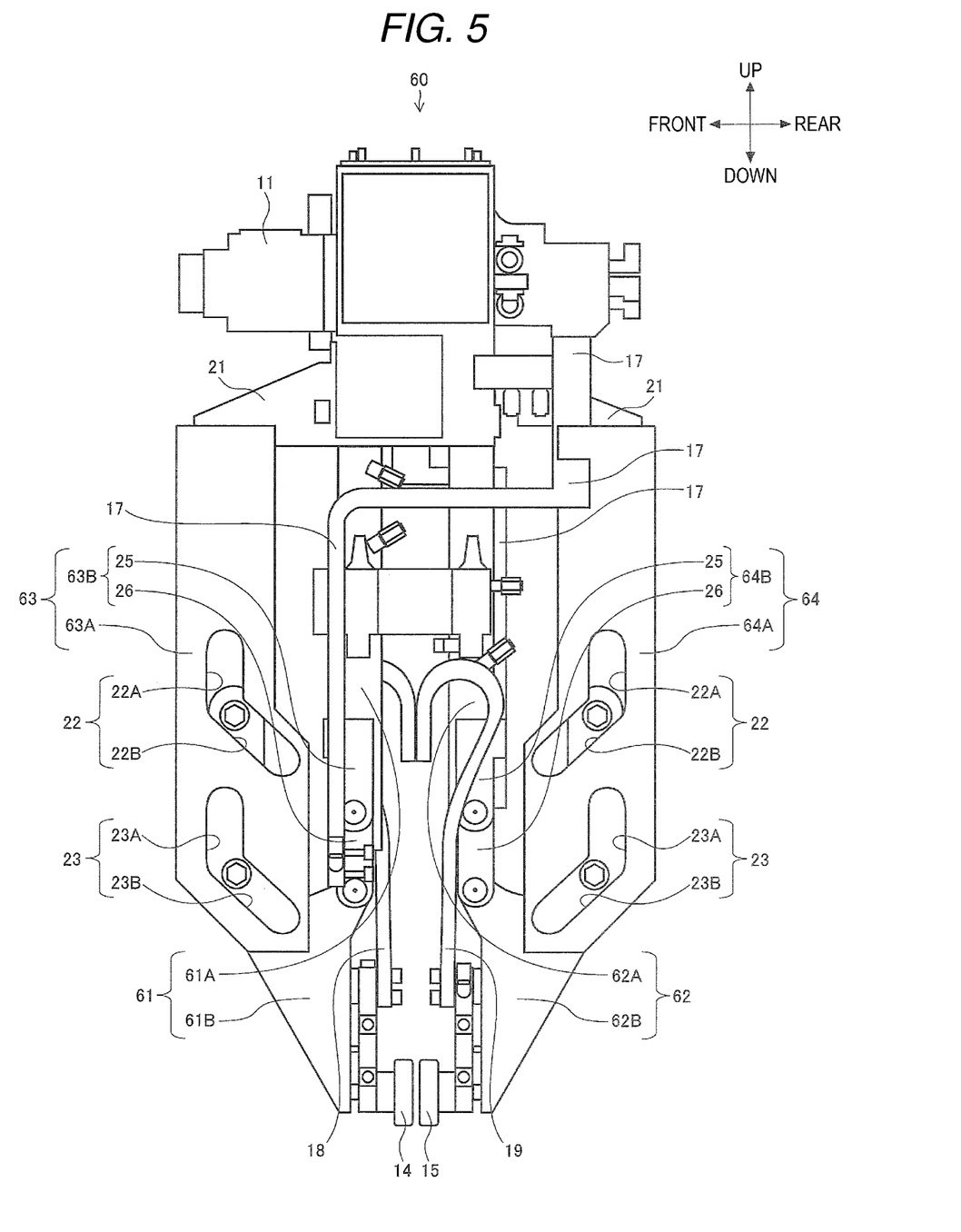
FIG. 5 is a side view illustrating a welding gun according to another embodiment of the disclosure.
Figure 6A:
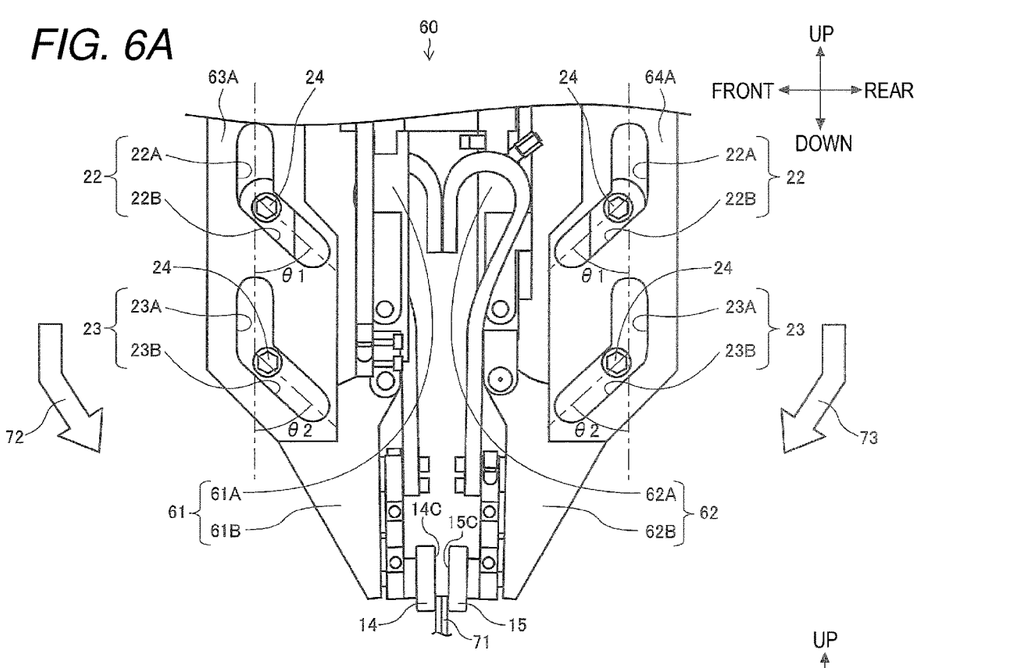
FIG. 6A and FIG. 6B are side views illustrating a welding method according to the other embodiment of the disclosure.
Figure 6B:
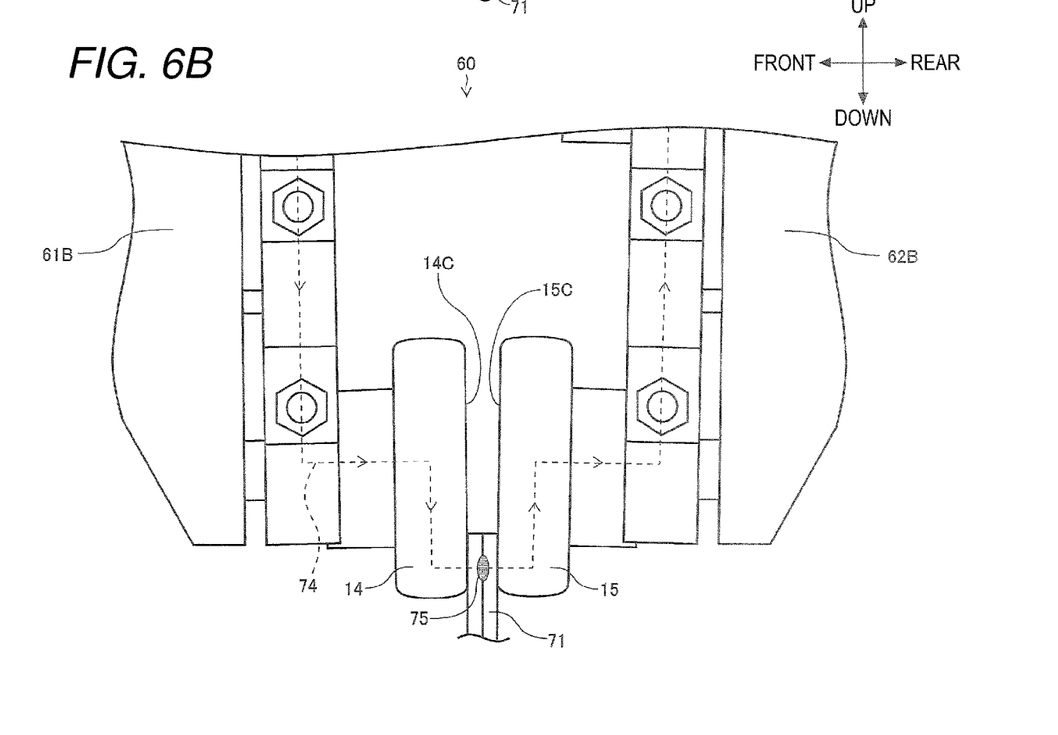
Figure 7A:
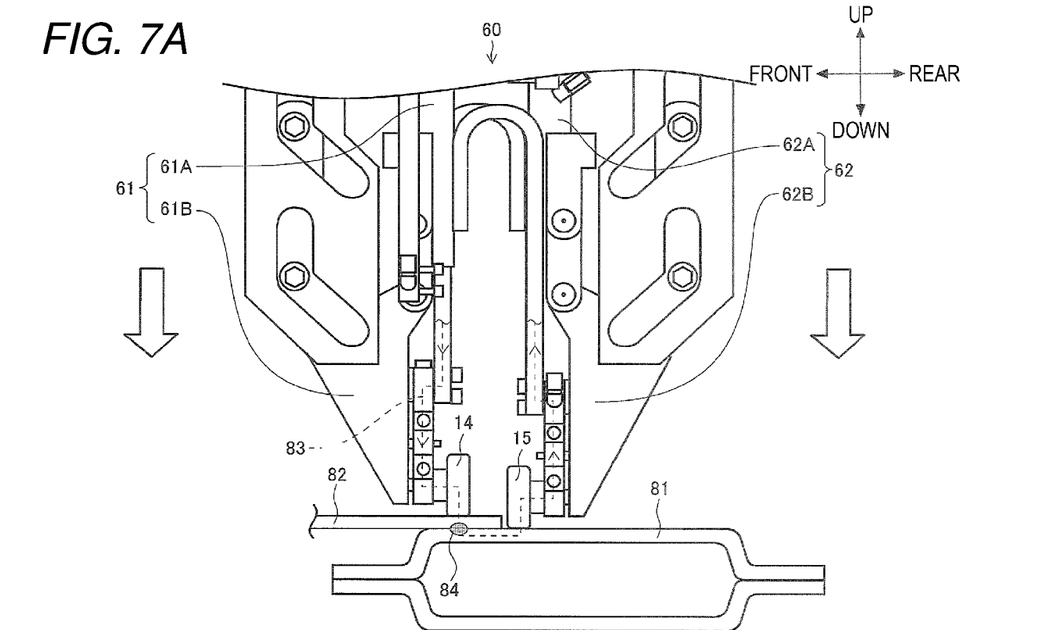
FIG. 7A and FIG. 7B are side views illustrating welding methods according to the other embodiment of the disclosure.
Figure 7B:
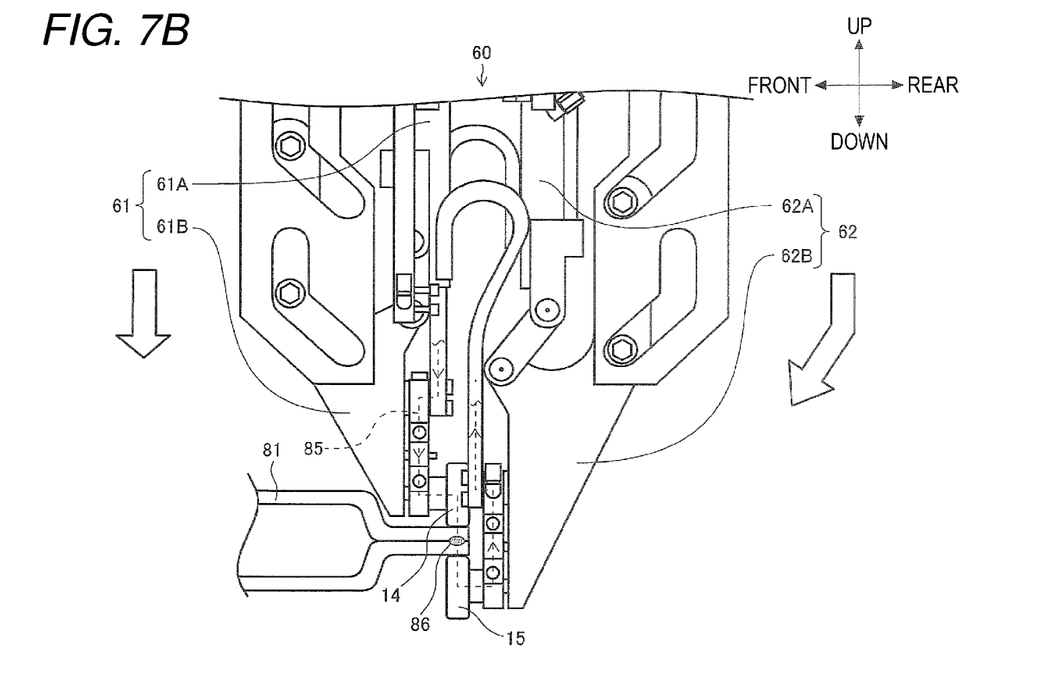

FIG. 5 is a side view illustrating the welding gun 60 according to the present embodiment. FIG. 6A and FIG. 6B are side views illustrating the welding method using the welding gun 60 according to the present embodiment. FIG. 7A and FIG. 7B are side views illustrating welding methods using the welding gun 60 according to the present embodiment.

As illustrated in FIG. 5, the welding gun 60 is disposed and used at the tip end of the arm 20 (see FIG. 1) of the welding robot (not illustrated) in the automobile assembly line or the like. The welding gun 60 mainly includes the transformer 11, the pair of movable arms 61 and 62 extending and retracting in the vertical direction, the pair of welding electrodes 14 and 15 disposed on tip end of the pair of movable arms 61 and 62, slide mechanisms 63 and 64 assembled in the movable arms 61 and 62, the wiring board 17 serving as a current path, and the pair of shunts 18 and 19 supporting movements of the pair of movable arms 61 and 62.

The movable arm 61 is a welding-side arm. The movable arm 61 mainly includes an air cylinder 61A extending and retracting in a vertical direction of the welding gun 60, and an electrode support bracket 61B disposed on a tip end of a shaft for extension and retraction of the air cylinder 61A.

The movable arm 62 is a ground side arm. The movable arm 62 mainly includes an air cylinder 62A extending and retracting in the vertical direction of the welding gun 60, and an electrode support bracket 62B disposed on a tip end of a shaft for extension and retraction of the air cylinder 62A.

The slide mechanism 63 mainly includes a pair of plate portions 63A for movably supporting the electrode support bracket 61B of the movable arm 61 in a substantially vertical direction, and a link mechanism 63B disposed between the air cylinder 61A and the electrode support bracket 61B of the movable arm 61.

The slide mechanism 64 mainly includes a pair of plate portions 64A for movably supporting the electrode support bracket 62B of the movable arm 62 in a substantially vertical direction, and a link mechanism 64B disposed between the air cylinder 62A and the electrode support bracket 62B of the movable arm 62.

The structure of the pair of plate portions 63A and 64A is substantially the same as the structure of the pair of plate portions 16A, and the structure of the link mechanisms 63B and 64B is substantially the same as the structure of the link mechanism 16B. As illustrated in the figure, both guide grooves 22 and 23 are formed in each of the pair of plate portions 63A and 64A, and support pins (not illustrated) with the rollers 24 at both ends thereof are disposed in the guide grooves 22 and 23. Rear ends of the electrode support brackets 61B and 62B are fixed at two positions to the two support pins between the pair of plate portions 63A and 64A.

The link mechanisms 63B and 64B each includes the first arm portion 25 and the second arm portion 26 rotatably coupled to the lower end of the first arm portion 25. The lower ends of the second arm portions 26 are fixed to front ends of the electrode support brackets 61B and 62B.

FIG. 6A illustrates a mode of welding an overlapping region on an end portion of a workpiece 71 by a direct spot welding, for example. In the overlapping region on the end portion of the workpiece 71, a desired welding position is sandwiched by the welding electrodes 14 and 15 in a front-back direction of the welding gun 60 to perform the welding. In the following description of the welding method, FIG. 1 will be appropriately referred to.

First, as illustrated in FIG. 5, in the welding gun 60, the air cylinders 61A and 62A of the movable arms 61 and 62 are extended from the most retracted state by the same stroke amount, and side surfaces 14C and 15C in the thrust direction of the welding electrodes 14 and 15 are in a state of facing each other at the same height.

For example, as illustrated in FIG. 6A, in the movable arms 61 and 62, the air cylinders 61A and 62A are extended by a certain amount, so that the electrode support brackets 61B and 62B are guided downward along the shapes of the guide grooves 22 and 23.

In the present embodiment, when the rollers 24 at both ends of the support pins (not illustrated) pass through the vertical grooves 22A and 23A and reach the oblique grooves 22B and 23B, the welding electrodes 14 and 15 slide toward a center of the welding gun 60. While the side surfaces 14C and 15C of the welding electrodes 14 and 15 are kept facing each other, a desired welding position of the workpiece 71 is sandwiched between lower ends of the side surfaces 14C and 15C. As illustrated by arrows 72 and 73, the movable arms 61 and 62 are guided by the vertical grooves 22A and 23A to slide in the vertical direction, and then are guided by the oblique grooves 22B and 23B to slide obliquely downward.

Next, as illustrated in FIG. 6B, in the movable arms 61 and 62 (see FIG. 6A), the air cylinders 61A and 62A (see FIG. 6A) are extended, and the desired welding position of the workpiece 71 is pressurized. In the control device (not illustrated) in the welding robot flows the current for the desired time based on the welding condition, when the measured value of the pressing force by the welding electrodes 14 and 15 reaches the set condition value. When a large current flows from the welding electrode 14 on the welding side to the welding electrode 15 on the ground side as illustrated by a dotted arrow 74, a nugget 75 is formed around a boundary surface in the overlapping region of the workpiece 71 between the welding electrodes 14 and 15.

Here, as illustrated in FIG. 6A, in the guide grooves 22 and 23 of the plate portions 63A and 64A, an angle $\theta 1$ between the vertical groove 22A and the oblique groove 22B is larger than an angle $\theta 2$ between the vertical groove 23A and the oblique groove 23B. For example, the angle $\theta 1$ is 46°, and the angle $\theta 2$ is 45°. The magnitudes of the angles $\theta 1$ and $\theta 2$ may be designed and changed in consideration of an ease of sandwiching the workpiece 71, a pressing condition and the like as well as the condition that the angle $\theta 1$>the angle $\theta 2$.

With this structure, since a separation distance between the side surfaces 14C and 15C of the welding electrodes 14 and 15 is reduced from an upper end side to a lower end side, the workpiece 71 is firmly sandwiched between the lower ends of the side surfaces 14C and 15C of the welding electrodes 14 and 15 and pressurized.

As a result, a contact area between the workpiece 71 and the side surfaces 14C and 15C of the welding electrodes 14 and 15 is reduced, so that a pressing force is hardly dispersed, and a desired pressing force is easily obtained.

In the welding gun 60, the seam welding and the continuous spot welding can be performed also by rotationally moving the welding electrodes 14 and 15 from the near side to the far side of the figure sheet or from the far side to the near side of the figure sheet with respect to the workpiece 71. Since the contact area between the workpiece 71 and the side surfaces 14C and 15C of the welding electrodes 14 and 15 is also reduced, a contact resistance is reduced, and the welding electrodes 14 and 15 are easily rotated.

FIG. 7A illustrates a mode in which a plate-shaped workpiece 82 is welded to one side of a bag-shaped workpiece 81 as described above with reference to FIG. 2A. The welding electrodes 14 and 15 are arranged side by side on the one side of the workpiece 81 to perform the welding. In the following description of the welding method, FIG. 5 will be appropriately referred to.

As illustrated in FIG. 7A, after the workpiece 82 is placed on an upper surface of the workpiece 81, the arm 20 (see FIG. 1) of the welding robot (not illustrated) is moved to bring the welding electrode 14 into contact with an upper surface of the workpiece 82 which is a desired welding position. In the movable arms 61 and 62, the air cylinders 61A and 62A are extended, the welding electrodes 14 and 15 are arranged side by side on the one side of the workpiece 81, and the workpieces 81 and 82 are pressurized by the welding electrodes 14 and 15.

Next, a control device (not illustrated) in the welding robot flows a current for a desired time based on a welding condition when a measured value of a pressing force by the welding electrodes 14 and 15 reaches a set condition value. When a large current flows from the welding electrode 14 on the welding side to the welding electrode 15 on the ground side as illustrated by a dotted arrow 83, a nugget 84 is formed around a boundary surface between the workpieces 81 and 82 immediately below the welding electrode 14.

FIG. 7B illustrates a mode of welding an overlapping region on an end portion of the bag-shaped workpiece 81 as described above with reference to FIG. 2B. In the overlapping region on the end portion of the workpiece 81, a desired welding position is sandwiched between the welding electrodes 14 and 15. In the following description of the welding method, FIG. 5 will be appropriately referred to.

As illustrated in FIG. 7B, in the movable arm 62, the air cylinder 62A is brought in the most extended state, the welding electrode 15 is moved to below the welding electrode 14, and the outer peripheral surface in the radial direction on the lower surface side of the welding electrode 14 faces the outer peripheral surface in the radial direction on the upper surface side of the welding electrode 15.

Next, the arm 20 (see FIG. 1) of the welding robot (not illustrated) is moved to bring the outer peripheral surface in the radial direction on the upper surface side of the welding electrode 15 into contact with a lower surface of the overlapping region of the workpiece 81 which is a desired welding position. In the movable arm 61, the air cylinder 61A is extended to bring the outer peripheral surface in the radial direction on the lower surface side of the welding electrode 14 into contact with an upper surface of the workpiece 81 at the desired welding position, and to pressurize the upper surface of the workpiece 81. By this operation, the welding position of the workpiece 81 is in a state of being sandwiched between the welding electrodes 14 and 15.

Next, a control device (not illustrated) in the welding robot flows a current for a desired time based on a welding condition when a measured value of a pressing force by the welding electrodes 14 and 15 reaches a set condition value. When a large current flows from the welding electrode 14 on the welding side to the welding electrode 15 on the ground side as illustrated by a dotted arrow 85, a nugget 86 is formed around a boundary surface of the overlapping region of the workpiece 81 immediately below the welding electrode 14.

As described above, in the welding modes illustrated in FIG. 7A and FIG. 7B, in the welding gun 60, the seam welding and the continuous spot welding can be performed also by rotationally moving the welding electrodes 14 and 15 from the near side to the far side of the figure sheet or from the far side to the nearside of the figure sheets. As described above with reference to FIG. 3 and FIG. 4, the welding electrode 41 is adopted as at least one of the welding-side electrode or the ground-side electrode, so that an effect similar to the above effect can be obtained.

In the embodiments, the welding guns 10 and 60 are disposed and used at the tip end of the arm 20 (see FIG. 1) of the welding robot (not illustrated) in the automobile assembly line or the like. It is noted that the embodiments of the disclosure are not limited to this case. For example, the welding guns 10 and 60 may be used in a state where the welding guns 10 and 60 are assembled in a welding device itself. In addition, various changes may be made without departing from the gist of the embodiments of the disclosure.

Effect of the Disclosure

In the welding gun according to the embodiments of the disclosure, a first welding electrode can move from the same height at which a second welding electrode is located to below the second welding electrode, and a first mode in which the first and second welding electrodes are brought into contact with one side of workpieces to weld the workpieces and a second mode in which the workpieces are sandwiched by the first and second welding electrodes to weld the workpieces can be implemented with one welding gun.

The first welding electrode can be easily moved to below the second welding electrode by the first slide mechanism, and an outer peripheral surface in a radial direction of the first welding electrode can face an outer peripheral surface in the radial direction of the second welding electrode.

The outer peripheral surface in the radial direction of the first welding electrode and the outer peripheral surface in the radial direction of the second welding electrode can face each other, so that a welding mode in which the workpieces are sandwiched between the two outer peripheral surfaces can be implemented.

The second welding column portion of the first welding electrode can be inserted into a narrow space of the workpiece. The welding mode in which the workpieces are sandwiched between the outer peripheral surface in the radial direction of the second welding column portion of the first welding electrode and the outer peripheral surface of the second welding electrode can be implemented.

By sliding either one of the first welding electrode and the second welding electrode downward according to a shape of the workpieces, the mode in which the workpieces are sandwiched between the first and second welding electrodes to weld the workpieces can be implemented with one welding gun.

The second welding electrode is easily moved to below the first welding electrode by the second slide mechanism, and the outer peripheral surface in the radial direction of the second welding electrode can face the outer peripheral surface in the radial direction of the first welding electrode.

While side surfaces, which face each other, of the first welding electrode and the second welding electrode located at the same height sandwich the workpieces therebetween, the welding can be performed.

According to the welding method of the embodiments of the disclosure, a first mode in which a first welding electrode and a second welding electrode are brought into contact with one side of workpieces to weld the workpieces and a second mode in which the workpieces are sandwiched by the first welding electrode and the second welding electrode to weld the workpieces can be easily implemented with one welding gun.

A seam welding can be implemented by flowing a current continuously while moving the first and second welding electrodes, and a continuous spot welding can be implemented by performing pulse energization without releasing a pressurized state for each welding point.

The invention claimed is:

1. A welding gun comprising:
a first arm;
a second arm movable with respect to the first arm along a first axis and a second axis orthogonal to the first axis;
a first welding electrode disposed on the first arm, the first welding electrode including a first roller rotatable around a first rotational axis with respect to the first arm, the first roller including a first cylindrical surface with the first rotational axis as a central axis and a first side surface orthogonal to the first rotational axis; and
a second welding electrode disposed on the second arm, the second welding electrode including a second roller rotatable around a second rotational axis with respect to the second arm, the second roller including a second cylindrical surface with the second rotational axis as a central axis and a second side surface orthogonal to the second rotational axis, wherein
the first arm supports the first welding electrode such that the first rotational axis is substantially parallel to a plane including the first and second axes, and the first side surface faces toward a first direction along the first axis,
the second arm supports the second welding electrode such that the second rotational axis is substantially parallel to the plane including the first and second axes, and the second side surface faces toward a second direction opposite to the first direction along the first axis,
the welding gun being configured to select
a first mode in which the first cylindrical surface of the first welding electrode and the second cylindrical surface of the second are brought into contact with one side of a workpiece to weld the workpiece,
a second mode in which the workpiece is sandwiched, to perform welding of the workpiece, between the first cylindrical surface of the first welding electrode and the second cylindrical surface of the second welding electrode, and
a third mode in which the workpiece is sandwiched, to perform welding of the workpiece, between the first side surface of the first welding electrode rotatable around the first rotational axis and the second side surface of the second welding electrode rotatable around the second rotational axis.

2. The welding gun according to claim 1, wherein in the third mode, the first and second arms support the first and second welding electrodes such that the first side surface and the second side surface are non-parallel and facing each other.

3. The welding gun according to claim 2, wherein in the third mode, the first and second arms support the first and second welding electrodes such that a distance between the first side surface and the second side surface is decreases toward a third direction along the second axis.

4. The welding gun according to claim 1, wherein the first and second arms support the first and second welding electrodes such that the first and second rotational axes are on the plane including the first and second axes.

5. The welding gun according to claim 4, wherein
in the first and second modes, the first and second arms support the first and second welding electrodes such that the first and second rotational axes are substantially parallel to the first axis, and
in the third mode, the first and second arms support the first and second welding electrodes such that i) the first and second rotational axes are intersect and ii) a distance between the first side surface and the second side surface is decreases toward a third direction along the second axis.

6. The welding gun according to claim 1, wherein the workpiece is welded at a location where the first cylindrical surface of the first welding electrode and the second cylindrical surface of the second roller are brought into contact with the one side of the workpiece in the first mode,
wherein the workpiece is welded at a location where the workpiece is sandwiched between the first cylindrical surface of the first welding electrode and the second cylindrical surface of the second welding electrode in the second mode, and
wherein the workpiece is welded at a location where the workpiece is sandwiched between the first side surface of the first welding electrode and the second side surface of the second welding electrode in the third mode.

7. A welding method using a welding gun, the welding gun comprising
a first arm,
a second arm movable with respect to the first arm along a first axis and a second axis orthogonal to the first axis,
a first welding electrode disposed on the first arm, the first welding electrode including a first roller rotatable around a first rotational axis with respect to the first arm, the first roller including a first cylindrical surface with the first rotational axis as a central axis and a first side surface orthogonal to the first rotational axis,
a second welding electrode disposed on the second arm, the second welding electrode including a second roller rotatable around a second rotational axis with respect to the second arm, the second roller including a second cylindrical surface with the second rotational axis as a central axis and a second side surface orthogonal to the second rotational axis, wherein
the first arm supports the first welding electrode such that the first rotational axis is substantially parallel to a plane including the first and second axes, and the first side surface faces toward a first direction along the first axis,
the second arm supports the second welding electrode such that the second rotational axis is substantially parallel to the plane including the first and second axes, and the second side surface faces toward a second direction opposite to the first direction along the first axis, and
a slide mechanism disposed on at least one of the first arm or the second arm, the welding method comprising:
enabling the first welding electrode to slide to below the second welding electrode by the slide mechanism, so as to enable a selection of
a first mode in which the first cylindrical surface of the first welding electrode and the second cylindrical surface of the second welding electrode are brought into contact with one side of a workpiece to weld the workpiece,
a second mode in which the workpiece is sandwiched, to perform welding of the workpiece, between the first cylindrical surface of the first welding electrode and the second cylindrical surface of the second welding electrode, and
a third mode in which the workpiece is sandwiched, to perform welding of the workpiece, between the first side surface of the first welding electrode rotatable around the first rotational axis and the second side surface of the second welding electrode rotatable around the second rotational axis.

8. The welding method according to claim 7, wherein in the third mode, the first and second arms support the first and second welding electrodes such that the first side surface and the second side surface are non-parallel and facing each other.

9. The welding method according to claim 8, wherein in the third mode, the first and second arms support the first and second welding electrodes such that a distance between the first side surface and the second side surface is decreases toward a third direction along the second axis.

10. The welding method according to claim 7, wherein the first and second arms support the first and second welding electrodes such that the first and second rotational axes are on the plane including the first and second axes.

11. The welding method according to claim 10, wherein in the first and second modes, the first and second arms support the first and second welding electrodes such that the first and second rotational axes are substantially parallel to the first axis, and in the third mode, the first and second arms support the first and second welding electrodes such that i) the first and second rotational axes are intersect and ii) a distance between the first side surface and the second side surface is decreases toward a third direction along the second axis.

* * * * *